United States Patent
Aoyama

(10) Patent No.: US 11,632,485 B2
(45) Date of Patent: Apr. 18, 2023

(54) IMAGE READING APPARATUS TO SEPARATELY TRANSMIT TWO IMAGES VIA FIRST COMMUNICATION DEVICE AND TRANSMIT IMAGE ACQUIRED BY COMBINING TWO IMAGES VIA SECOND COMMUNICATION DEVICE

(71) Applicant: PFU LIMITED, Kahoku (JP)

(72) Inventor: Katsunori Aoyama, Kahoku (JP)

(73) Assignee: PFU LIMITED, Kahoku (JP)

( * ) Notice: Subject to any disclaimer, the term of this patent is extended or adjusted under 35 U.S.C. 154(b) by 1 day.

(21) Appl. No.: 17/650,817

(22) Filed: Feb. 11, 2022

(65) Prior Publication Data
US 2022/0303429 A1 Sep. 22, 2022

(30) Foreign Application Priority Data
Mar. 17, 2021 (JP) .............................. JP2021-043431

(51) Int. Cl.
*H04N 1/00* (2006.01)
*H04N 1/32* (2006.01)
*H04N 1/387* (2006.01)

(52) U.S. Cl.
CPC ....... *H04N 1/32523* (2013.01); *H04N 1/3248* (2013.01); *H04N 1/32128* (2013.01); *H04N 1/32368* (2013.01); *H04N 1/32555* (2013.01); *H04N 1/32566* (2013.01); *H04N 1/3876* (2013.01)

(58) Field of Classification Search
CPC .................................................... H04N 1/3248
See application file for complete search history.

(56) References Cited

U.S. PATENT DOCUMENTS

2019/0286004 A1* 9/2019 Sakuraba ........... G03G 15/0266

FOREIGN PATENT DOCUMENTS

JP 2003-78693 A 3/2003

* cited by examiner

*Primary Examiner* — Benjamin O Dulaney
(74) *Attorney, Agent, or Firm* — Lewis Roca Rothgerber Christie LLP

(57) ABSTRACT

An image reading apparatus includes an imaging device, a first communication device capable of communicating at a first communication speed according to a first communication protocol, a second communication device capable of communicating at a second communication speed lower than the first communication speed according to a second communication protocol different from the first communication protocol, a first processor to separately transmit a first image acquired by imaging a first surface of a medium by the imaging device, and a second image acquired by imaging a second surface of the medium by the imaging device, via the first communication device, and a second processor to transmit a combined image acquired by combining the first image and the second image via the second communication device.

12 Claims, 7 Drawing Sheets

IMAGE READING APPARATUS TO SEPARATELY TRANSMIT TWO IMAGES VIA FIRST COMMUNICATION DEVICE AND TRANSMIT IMAGE ACQUIRED BY COMBINING TWO IMAGES VIA SECOND COMMUNICATION DEVICE

CROSS-REFERENCE TO RELATED APPLICATIONS

This application is based upon and claims the benefit of priority of prior Japanese Patent Application No. 2021-43431, filed on Mar. 17, 2021, the entire contents of which are incorporated herein by reference.

TECHNICAL FIELD

Embodiments discussed in the present specification relate to transmission of an image.

BACKGROUND

An image reading apparatus, such as a scanner, transmits an image acquired by imaging a medium to an information processing apparatus, such as a server or a personal computer, so that the image is appropriately managed. In recent years, one image reading apparatus is often used in various applications, and the image reading apparatus includes a plurality of communication devices and is provided so as to be capable of communicating with a plurality of information processing apparatuses through the plurality of communication devices.

An image reading apparatus to simultaneously read both a front surface and a back surface of a document by an image sensor of two optical systems is disclosed (Japanese Unexamined Patent Publication (Kokai) No. 2003-78693). The image reading apparatus performs compression processing after generating an image in which each of an image of the front surface and an image of the back surface are located on the left and right sides, and transfers the compressed image to a host computer. The host computer decompresses the compressed image data and separates the image data into image data of each of the front surface and the back surface.

SUMMARY

According to some embodiments, an image reading apparatus includes an imaging device, a first communication device capable of communicating at a first communication speed according to a first communication protocol, a second communication device capable of communicating at a second communication speed lower than the first communication speed according to a second communication protocol different from the first communication protocol, a first processor to separately transmit a first image acquired by imaging a first surface of a medium by the imaging device, and a second image acquired by imaging a second surface of the medium by the imaging device, via the first communication device, and a second processor to transmit a combined image acquired by combining the first image and the second image via the second communication device.

According to some embodiments, a method for controlling a communication, includes, separately transmitting a first image acquired by imaging a first surface of a medium by an imaging device, and a second image acquired by imaging a second surface of the medium by the imaging device, via a first communication device capable of communicating at a first communication speed according to a first communication protocol, and transmitting a combined image acquired by combining the first image and the second image via a second communication device capable of communicating at a second communication speed lower than the first communication speed according to a second communication protocol different from the first communication protocol.

According to some embodiments, a computer-readable, non-transitory medium stores a computer program. The computer program causes an image reading apparatus including an imaging device, a first communication device capable of communicating at a first communication speed according to a first communication protocol, and a second communication device capable of communicating at a second communication speed lower than the first communication speed according to a second communication protocol different from the first communication protocol, to execute a process including separately transmit a first image acquired by imaging a first surface of a medium by the imaging device, and a second image acquired by imaging a second surface of the medium by the imaging device, via the first communication device, and transmitting a combined image acquired by combining the first image and the second image via the second communication device.

DESCRIPTION OF EMBODIMENTS

It is to be understood that both the foregoing general description and the following detailed description are exemplary and explanatory, and are not restrictive of the invention, as claimed.

Hereinafter, an image reading apparatus, a method for controlling a communication, and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
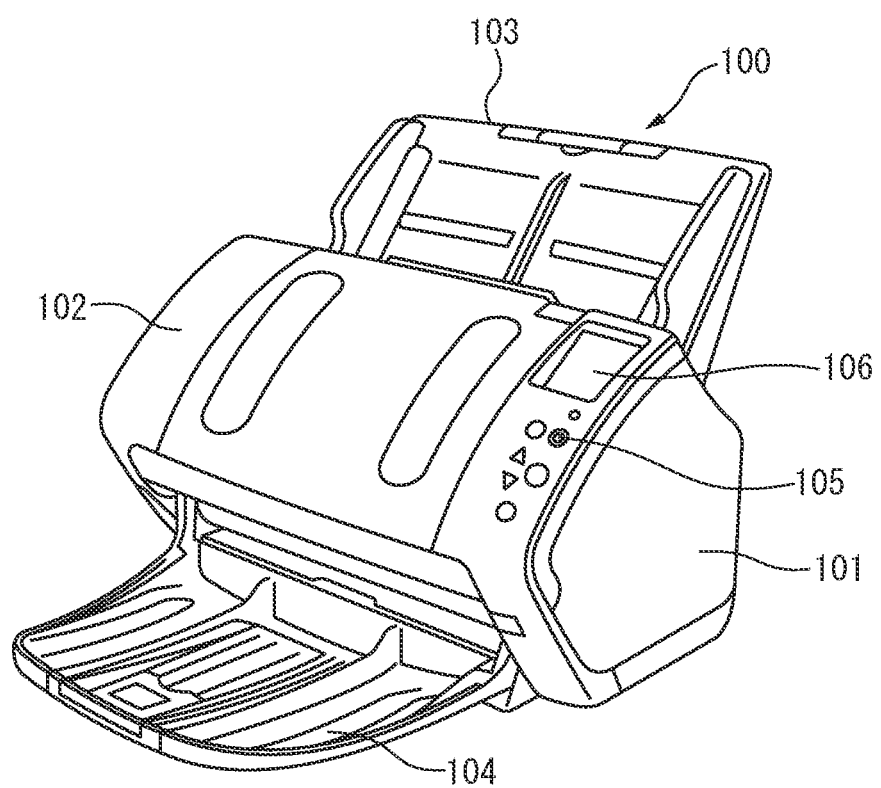
FIG. 1 is a perspective view illustrating an image reading apparatus 100 according to an embodiment.

FIG. 1 is a perspective view illustrating an image reading apparatus 100 configured as an image scanner.

The image reading apparatus 100 conveys and images a medium that is a document. A medium is paper, thick paper, a card, a brochure, a passport, etc. The image reading apparatus 100 may be a facsimile, a copying machine, a printer multifunction machine (MFP, Multifunction Peripheral), etc. The image reading apparatus 100 may be an apparatus having an imaging function and a communication function, and may be a mobile phone, a personal computer, etc.

The image reading apparatus 100 includes a lower housing 101, an upper housing 102, a medium tray 103, an ejection tray 104, an operation device 105, and a display device 106, etc.

The upper housing 102 is located at a position covering the upper surface of the image reading apparatus 100 and is engaged with the lower housing 101 by hinges so as to be opened and closed at a time of medium jam, during cleaning the inside of the image reading apparatus 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user.

The display device 106 is an example of a display device, and includes a display including a liquid crystal or organic electro-luminescence (EL), and an interface circuit for outputting image data to the display, and displays the image data on the display.

Figure 2:
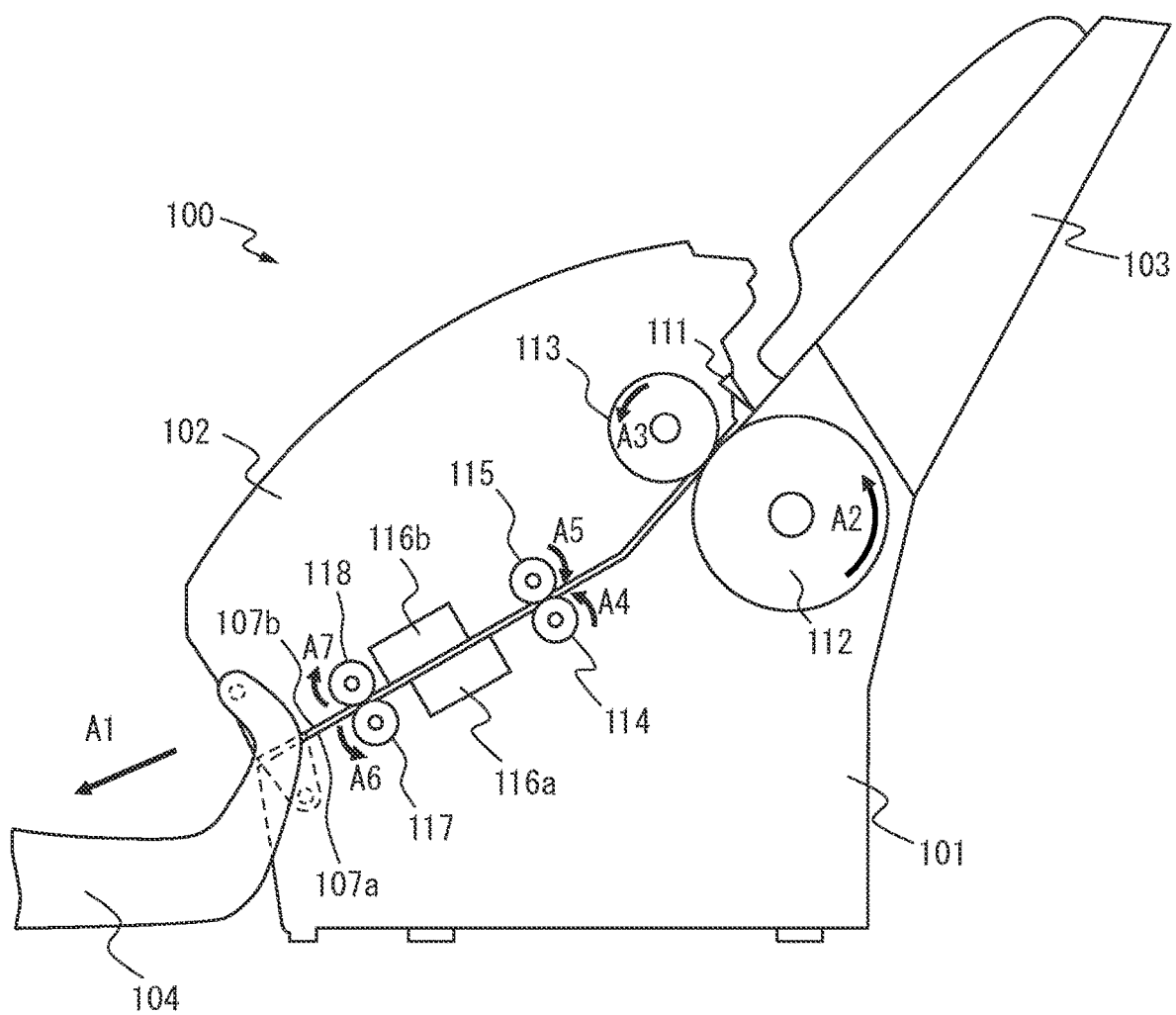
FIG. 2 is a diagram for illustrating a conveyance path inside the image reading apparatus 100.

FIG. 2 is a diagram for illustrating a conveyance path inside the image reading apparatus 100.

The conveyance path inside the image reading apparatus 100 includes a sensor 111, a feed roller 112, a brake roller 113, a first conveyance roller 114, a second conveyance roller 115, a first imaging device 116a, a second imaging device 116b, a third conveyance roller 117 and a fourth conveyance roller 118, etc. The number of each roller is not limited to one, and may be plural.

Atop surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. Hereinafter, an upstream refers to an upstream in the medium conveying direction A1, and a downstream refers to a downstream in the medium conveying direction A1.

The sensor 111 is located upstream of the feed roller 112 and the brake roller 113. The sensor 111 includes a contact detection sensor, and detects whether or not a medium is placed on the medium tray 103. The sensor 111 generates and outputs a medium signal whose signal value changes in a state where the medium is placed on the medium tray 103 and a state where the medium is not placed.

The first imaging device 116a includes a line sensor based on a unity-magnification optical system type contact image sensor (CIS) including an imaging element based on a complementary metal oxide semiconductor (CMOS) linearly located in a main scanning direction. Further, the first imaging device 116a includes a lens for forming an image on the imaging element, and an A/D converter for amplifying and analog-digital (A/D) converting an electric signal output from the imaging element. The first imaging device 116a sequentially generates and outputs first line images acquired by imaging a front surface of the conveyed medium. Specifically, a pixel count of a first line image in a vertical direction (sub-scanning direction) is 1, and a pixel count in a horizontal direction (main scanning direction) is larger than 1. The front surface of the medium is an example of a first surface.

Similarly, the second imaging device 116b includes a line sensor based on a unity-magnification optical system type CIS including an imaging element based on a CMOS linearly located in a main scanning direction. Further, the second imaging device 116b includes a lens for forming an image on the imaging element, and an A/D converter for amplifying and A/D converting an electric signal output from the imaging element. The second imaging device 116b sequentially generates and outputs second line images acquired by imaging a back surface of the conveyed medium. Specifically, a pixel count of a second line image in a vertical direction (sub-scanning direction) is 1, and a pixel count in a horizontal direction (main scanning direction) is larger than 1. The back surface of the medium is an example of a second surface.

A line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs may be used. Hereinafter, the first imaging device 116a and the second imaging device 116b may be collectively referred to as an imaging device 116. The imaging device 116 is an example of imaging module.

A medium placed on the medium tray 103 is conveyed between the lower guide 107a and the upper guide 107b in the medium conveying direction A1 by the feed roller 112 rotating in a direction of an arrow A2 in FIG. 2, that is, a medium feeding direction. When a medium is conveyed, the brake roller 113 rotates in a direction of an arrow A3, that is, a direction opposite to the medium feeding direction. By the workings of the feed roller 112 and the brake roller 113, when a plurality of media are placed on the medium tray 103, only a medium in contact with the feed roller 112, out of the media placed on the medium tray 103, is separated. Consequently, the image reading apparatus 100 operates in such a way that conveyance of a medium other than the separated medium is restricted (prevention of multi-feed).

The medium is fed between the first conveyance roller 114 and the second conveyance roller 115 while being guided by the lower guide 107a and the upper guide 107b. The medium is fed between the first imaging device 116a and the second imaging device 116b by the first conveyance roller 114 and the second conveyance roller 115 rotating in directions of an arrow A4 and an arrow A5, respectively. The medium read by the imaging device 116 is ejected on the ejection tray 104 by the third conveyance roller 117 and the fourth conveyance roller 118 rotating in directions of an arrow A6 and an arrow A7, respectively.

Figure 3:
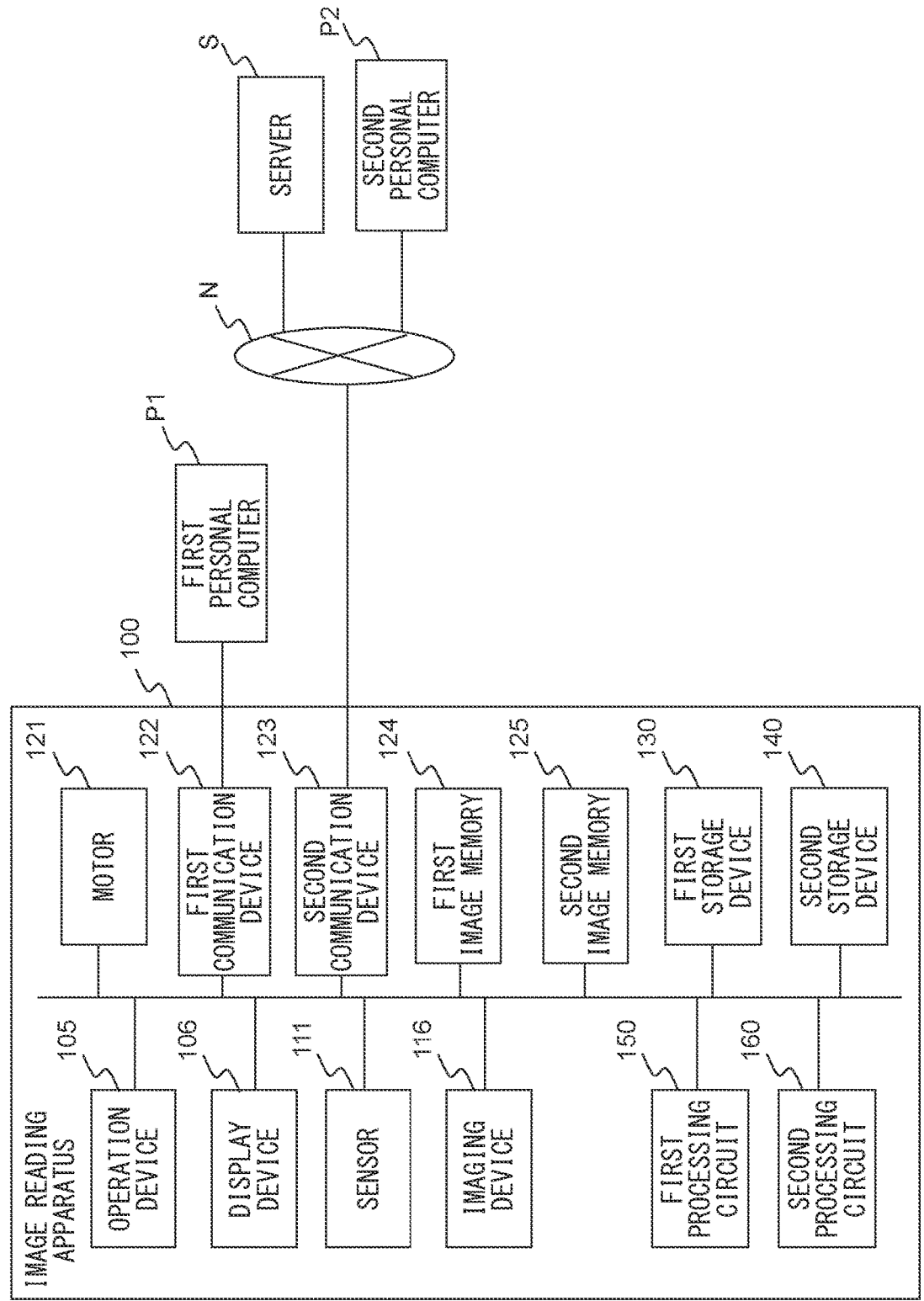
FIG. 3 is a block diagram illustrating a schematic configuration of the image reading apparatus 100.

FIG. 3 is a block diagram illustrating a schematic configuration of the image reading apparatus 100.

The image reading apparatus 100 further includes a motor 121, a first communication device 122, a second communication device 123, a first image memory 124, a second image memory 125, a first storage device 130, a second storage device 140, a first processing circuit 150, a second processing circuit 160, etc., in addition to the configuration described above. The operation device 105, the display device 106, the sensor 111, the imaging device 116, the motor 121, the first communication device 122, the second communication device 123, the first image memory 124, the second image memory 125, the first storage device 130, the second storage device 140, the first processing circuit 150 and the second processing circuit 160 are connected to each other through a bus.

The motor 121 includes one or more motors. The motor 121 conveys the medium by rotating the feed roller 112, the brake roller 113, the first conveyance roller 114, the second conveyance roller 115, the third conveyance roller 117 and the fourth conveyance roller 118 by a control signal from the first processing circuit 150.

The first communication device 122 is an example of the first communication module, and is provided so as to be capable of communicating at a first communication speed according to a first communication protocol. For example, the first communication device 122 includes an interface circuit according to a serial bus such as a USB (Universal Serial Bus). In this case, the first communication protocol is a USB communication protocol, and the first communication speed is several hundred Mbps (Bits Per Second) to several Gbps. The first communication device 122 is connected to an information processing apparatus such as a first personal computer P1, via a wired cable such as a USB cable, and is provided communicatively with the connected information processing apparatus. The first communication device 122 supplies data received from the communicatively connected information processing apparatus to the first processing circuit 150, and transmits data supplied from the first processing circuit 150 to the communicatively connected information processing apparatus.

The first communication device 122 may be any device, as long as it can communicate with other devices. For example, the first communication device 122 may include a wired communication interface circuit according to a communication protocol such as TCP/IP (Transmission Control Protocol/Internet Protocol), and may be connected to the information processing apparatus via a network. In this case, the first communication protocol is TCP/IP and the first communication speed is 100 Mbps to 1 Gbps.

The second communication device 123 is an example of the second communication module, and is provided so as to be capable of communicating at a second communication speed lower than the first communication speed according to a second communication protocol different from the first communication protocol. For example, the second communication device 123 includes a wired communication interface circuit according to a communication protocol such as TCP/IP. In this case, the second communication protocol is TCP/IP and the second communication speed is 100 Mbps to 1 Gbps. The first communication device 122 communicates with (is connected to) a network N such as an intranet or an Internet, in accordance with a communication standard such as Ethernet (registered trademark). The second communication device 123 supplies data received from an information processing apparatus communicatively connected via the network N to the first processing circuit 150, and transmits data supplied from the first processing circuit 150 to the information processing apparatus communicatively connected via the network N.

The network N is connected to an information processing apparatus such as a server S and a second personal computer P2, and the second communication device 123 is provided communicatively with each information processing apparatus connected to the network N via the network N.

The second communication device 123 may be any device, as long as it can communicate with other devices. For example, the second communication device 123 may have an antenna for transmitting and receiving a wireless signal, and a wireless communication interface circuit according to a communication protocol such as a wireless LAN. In this case, the second communication protocol is a communication protocol of the wireless LAN, and the second communication speed is several ten Mbps to several hundred Mbps. The second communication device 123 wirelessly establishes a communication connection with an access point of the wireless LAN, and is connected to the network N via an access point.

The first image memory 124 includes a memory device such as a RAM (Random Access Memory), a ROM (Read Only Memory), etc. The first image memory 124 temporarily stores the image acquired by the imaging device 116.

The second image memory 125 is an example of a storage device, and includes a memory device such as a RAM, a ROM, etc. The second image memory 125 temporarily stores the image acquired by the imaging device 116.

The first storage device 130 includes a memory device such as a RAM or a ROM, a fixed disk device such as a hard disk, or a portable storage device such as a flexible disk or an optical disk. The first storage device 130 stores computer programs, databases, tables, etc., used for various kinds of processing of the image reading apparatus 100. The computer program may be installed on the storage device 130 from a computer-readable, non-transitory medium such as a compact disc read only memory (CD-ROM), a digital versatile disc read only memory (DVD-ROM), or the like by using a well-known setup program etc.

The second storage device 140 includes a memory device such as a RAM or a ROM, a fixed disk device such as a hard disk, or a portable storage device such as a flexible disk or an optical disk. The second storage device 140 stores computer programs, databases, tables, etc., used for various kinds of processing of the image reading apparatus 100. The computer program may be installed on the second storage device 140 from a computer-readable, non-transitory medium such as a CD-ROM, a DVD-ROM, or the like by using a well-known setup program etc.

The first processing circuit 150 is an example of a first processor. The first processing circuit 150 operates according to a program stored in advance in the first storage device 130. The first processing circuit 150 is, for example, a CPU (Central Processing Unit), etc. The first processing circuit 150 may be a digital signal processor (DSP), a large scale integration (LSI), an application specific integrated circuit (ASIC), a field-programmable gate array (FPGA), etc.

The first processing circuit 150 is connected to the operation device 105, the display device 106, the sensor 111, the imaging device 116, the motor 121, the first communication device 122, the first image memory 124, the first storage device 130 and the second processing circuit 160, etc., and controls each of these units. The first processing circuit 150 performs the control of the operation device 105, the display control of the display device 106, the communication control of the first communication device 122, the control of the first image memory 124 and the first storage device 130, etc. Further, the first processing circuit 150 performs the drive control of the motor 121, the imaging control of the imaging device 116, etc., according to the medium signal from the sensor 111, acquires an image, and transmits it to the information processing apparatus via the first communication device 122, or to the second processing circuit 160.

The second processing circuit 160 is an example of a second processor, and is a processor separate from the first processing circuit 150. The second processing circuit 160 operates according to a program stored in advance in the second storage device 140. The second processing circuit 160 is, for example, a CPU, etc. The second processing circuit 160 may be a DSP, an LSI, an ASIC, a FPGA, etc. For example, as the second processing circuit 160, a processor having a lower processing capacity than the first processing circuit 150, is used. As the second processing circuit 160, a processor having a same processing capacity as the first processing circuit 150 or a higher processing capacity than the first processing circuit 150, may be used. The first processing circuit 150 and the second processing circuit 160 may be one (common) processor.

The second processing circuit 160 is connected to the second communication device 123, the second image memory 125, the second storage device 140 and the first processing circuit 150, etc., and controls each of these units. The second processing circuit 160 performs communication control of the second communication device 123, the control of the second image memory 125 and the second storage device 140. The second processing circuit 160 receives the image from the first processing circuit 150, combines the received image, and transmits the combined image to the information processing apparatus via the second communication device 123.

Figure 4:
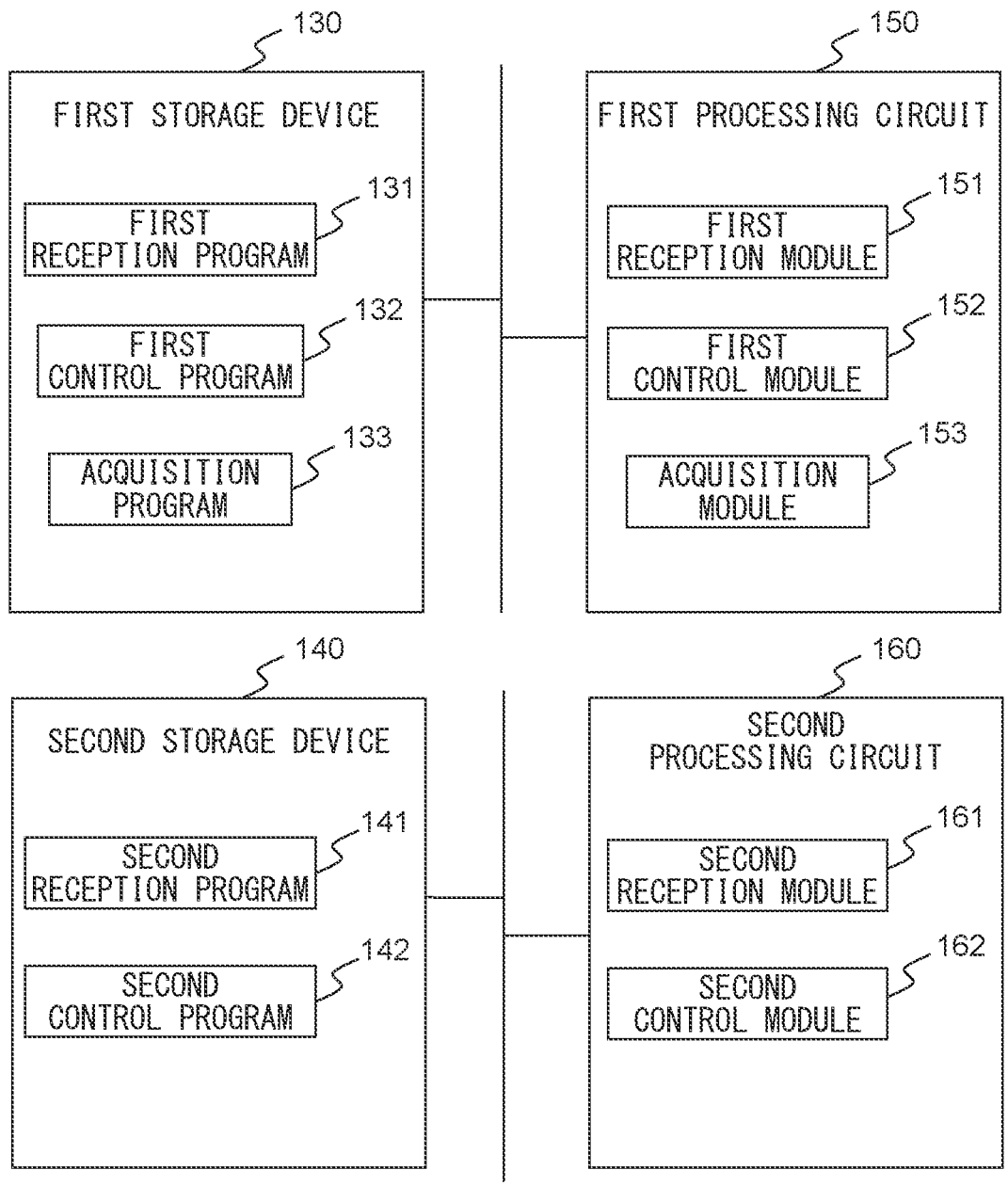
FIG. 4 is a diagram illustrating a schematic configuration of a first processing circuit 150 and the second processing circuit 160, etc.

FIG. 4 is a diagram illustrating a schematic configuration of a first storage device 130, the second storage device 140, the first processing circuit 150 and the second processing circuit 160.

As illustrated in FIG. 4, a first reception program 131, a first control program 132 and an acquisition program 133, etc., are stored in the first storage device 130. Each of these programs is a functional module implemented by software operating on a processor. The first processing circuit 150 reads each program stored in the first storage device 130, and operates according to each of the read programs. Thus, the first processing circuit 150 functions as a first reception module 151, a first control module 152 and an acquisition module 153. That is, the first reception module 151, the first control module 152 and the acquisition module 153 operates on the first processing circuit 150.

Further, a second reception program 141 and a second control program 142, etc., are stored in the second storage device 140. Each of these programs is a functional module implemented by software operating on a processor. The second processing circuit 160 reads each program stored in the second storage device 140, and operates according to each of the read programs. Thus, the second processing circuit 160 functions as a second reception module 161 and a second control module 162. That is, the second reception module 161 and the second control module 162 operates on the second processing circuit 160.

Figure 5:
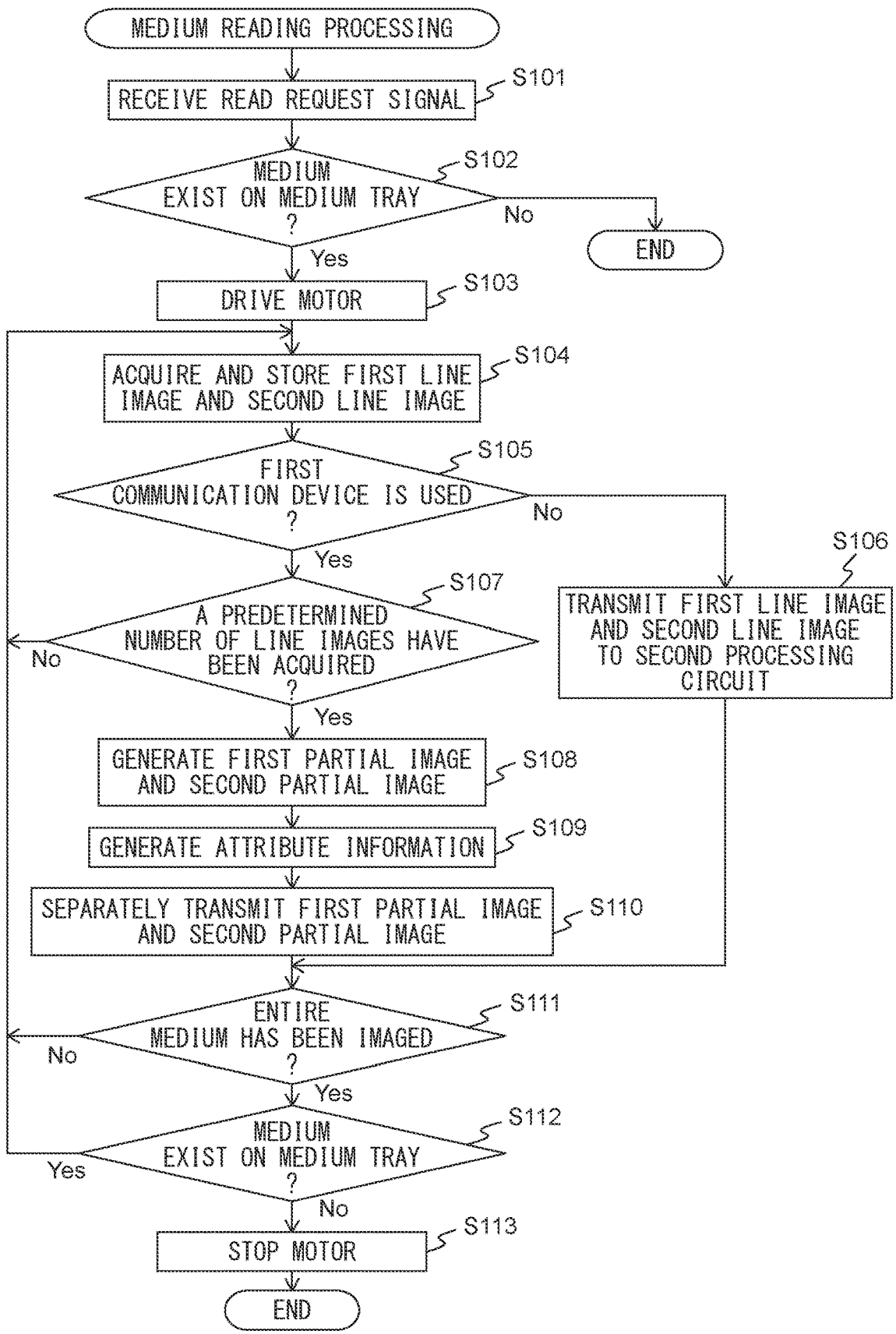
FIG. 5 is a flowchart illustrating an operation example of a medium reading processing.

FIG. 5 is a flowchart illustrating an operation example of a medium reading processing of the image reading apparatus 100.

Referring to the flowchart illustrated in FIG. 5, the operation example of the medium reading processing in the image reading apparatus 100 will be described below. Note that a flow of the operation described below is performed in cooperation with each element of the image reading apparatus 100 mainly by the first processing circuit 150, based on the program being previously stored in the first storage device 130. The operation flow illustrated in FIG. 5 is periodically executed.

Before execution of the medium reading processing, the first reception module 151 receives a setting of a transmission destination of the image (destination apparatus) and the communication device used for transmitting the image. The server S, the first personal computer P1 or the second personal computer P2, etc., is set as the transmission destination of the image (destination apparatus). The first communication device 122 or the second communication device 123 is set as the communication device used for transmitting an image. The first reception module 151 receives each setting, for example, by receiving from the first personal computer P1, etc., via the first communication device 122. The second reception module 161 may receive each setting from the server S or the second personal computer P2, etc., via the second communication device 123, and the first reception module 151 may receive each setting from the second reception module 161 by well-known inter-processor communication. Further, the first reception module 151 may receive each setting from a user using the operation device 105. The first reception module 151 stores the set destination and communication device in the first storage device 130.

First, the first reception module 151 waits until it receives a read request signal for requesting reading of the medium (step S101). For example, the first reception module 151 receives the read request signal from the first personal computer P1, etc., via the first communication device 122. The second reception module 161 may receive the read request signal from the server S or the second personal computer P2, etc., via the second communication device 123, and the first reception module 151 may receive the read request signal from the second reception module 161 by well-known inter-processor communication. Further, the first reception module 151 may receive the read request signal from the user using the operation device 105.

The read request signal may also include a job. The job is a setting relating to a medium reading processing of the image reading apparatus 100, and is set for each type of the medium (general paper, business card, photograph, etc.) to be read by the image reading apparatus 100, for example. The job includes settings such as color setting of the generated input image (color/gray scale/black and white, etc.), resolution (200 dpi/300 dpi/600 dpi, etc.), and reading surface (both sides/one side).

Next, the first control module 152 acquires the medium signal from the sensor 111 and determines whether or not the medium is placed on the medium tray 103 based on the acquired medium signal (step S102). When the medium is not placed on the medium tray 103, the first control module 152 ends the series of steps without executing the reading of the medium.

On the other hand, when the medium is placed on the medium tray 103, the first control module 152 drives the motor 121 to rotate the feed roller 112, the brake roller 113, the first to fourth conveyance rollers 114, 115, 117 and 118 to convey the medium (step S103). Further, the first control module 152 causes the imaging device 116 to start imaging the medium according to the specified job.

Next, the acquisition module 153 acquires the first line image and the second line image from the imaging device 116, and stores them in the first image memory 124 (step S104). The acquisition module 153 periodically acquires the first line image and the second line image according to a timing corresponding to the resolution set in the specified job. The first image memory 124 temporarily stores an image acquired by the imaging device 116 before the image is transmitted from the first communication device 122 or the second communication device 123.

Next, the first control module 152 determines whether the first communication device 122 is set as the communication device used for transmitting images or the second communication device 123 is set as the communication device used for transmitting images (step S105).

When the second communication device 123 is set as the communication device used for transmitting the image, the first control module 152 transmits the first line image and the second line image to the second processing circuit 160 by well-known inter-processor communication (step S106), and proceeds the process to step S111. The first control module 152 erases the transmitted first line image and second line image from the first image memory 124.

On the other hand, when the first communication device 122 is set as the communication device used for transmitting the image, the first control module 152 determines whether or not the acquisition module 153 has acquired a predetermined number of first line images and second line images (step S107). The first control module 152 determines whether or not the number of the first line images and the second line images which have not been transmitted to the destination apparatus, of the first line images and the second line images acquired from the imaging device 116, is the predetermined number or more. The predetermined number is set to an arbitrary number being equal to or more than 1 and equal to or less than the maximum number of lines. The maximum number of lines is the number of lines when the medium having the maximum size supported by the image reading apparatus 100 is imaged at the maximum resolution. The image reading apparatus 100 can reduce the delay of the transmission of the image as the predetermined number is smaller, and can reduce the processing load for the transmission of the image as the predetermined number is larger. When the predetermined number of the first line images and the second line images have not been acquired, the first control module 152 returns the process to step S104. Thus, the acquisition module 153 newly acquires the first line image and the second line image from the imaging device 116.

On the other hand, when the acquisition module 153 has acquired the predetermined number of the first line images and the second line images, the first control module 152 combines the predetermined number of the first line images to generate a first partial image, and combines the predetermined number of the second line images to generate a second partial image (step S108). The first control module 152 combines the predetermined number of the first line images and the predetermined number of the second line images which have not been transmitted to the destination apparatus, of the first line images and the second line images acquired from the imaging device 116 to generate the first partial image and the second partial image, respectively.

The first partial image is an example of a first image acquired by imaging the front surface of the medium by the imaging device 116, and the second partial image is an example of a second image acquired by imaging the back surface of the medium by the imaging device 116. When the predetermined number is 1, the first partial image and the second partial image are the first line image and the second line image, respectively. On the other hand, when the predetermined number is equal to or more than the number corresponding to a length in the medium conveying direction A1 of the medium currently conveyed, the first partial image and the second partial image include the entire medium, respectively.

Next, the first control module 152 generates attribute information for each of the first partial image and the second partial image (step S109). The attribute information includes information such as the horizontal and vertical sizes (the number of pixels), the resolution, and the order (how many media, of the medium group collectively placed on the medium tray 103, have been conveyed and imaged until the image is acquired) of each image.

Next, the first control module 152 transmits the first partial image and the attribute information of the first partial image, and the second partial image and the attribute information of the second partial image to the destination apparatus via the first communication device 122 (step S110). The first control module 152 separately transmits the first partial image and the second partial image via the first communication device 122. The first control module 152 erases the first line image and the second line image corresponding to the transmitted first partial image and second partial image from the first image memory 124.

Next, the first control module 152 determines whether or not the entire medium has been imaged (step S111). For example, the first control module 152 determines that the entire medium has been imaged, for example, when a predetermined time has elapsed since the start of conveying the medium. A medium sensor to detect presence or absence of the medium may be located in the vicinity of the imaging device 116, and the first control module 152 may determine whether or not the entire medium has been imaged based on an output signal from the medium sensor. In that case, the first control module 152 periodically acquires the output signal from the medium sensor, and determines that the rear end of the medium has passed through the position of the medium sensor when the output signal changes from a state indicating that the medium is present to a state indicating that the medium is not present. The first control module 152 determines that the rear end of the medium has passed through the imaging position of the imaging device 116 and the entire medium has been imaged when a predetermined time has elapsed since the rear end of the medium passes through the position of the medium sensor. When the entire medium has not been imaged, the first control module 152 returns the process to step S104, and repeats the processes in steps S104 to S111.

On the other hand, when the entire medium has been imaged, the first control module 152 determines whether or not the medium remains on the medium tray 103 based on the medium signal received from the sensor 111 (step S112). When the medium remains on the medium tray 103, the first control module 152 returns the process to step S104, and repeats the processes in steps S104 to S111. Further, when the second communication device 123 is set as the communication device used for transmitting the image, the first control module 152 transmits a signal indicating that the entire medium has been imaged, to the second processing circuit 160, by well-known inter-processor communication.

On the other hand, when no medium remains on the medium tray 103, the first control module 152 stops the motor 121 to stop the feeding roller 112, the brake roller 113, and the first to fourth conveyance rollers 114, 115, 117 and 118 (step S113), and ends a series of steps.

In step S108, the first control module 152 may generate an image to which an image acquired by combining the predetermined number of the first line images and the second line images is encoded using a predetermined coding system, as the first partial image and the second partial image, respectively. The predetermined coding system is, for example, JPEG (Joint Photographic Experts Group). In that case, in step S109, the first control module 152 may generate the attribute information so that the quantization table used for the coding is included in the attribute information. The destination apparatus receives the combined image and the attribute information, and decodes the first partial image and the second partial image using the quantization table included in the received attribute information.

Further, the processes in steps S107 to S110 may be omitted, and the first control module 152 may generate images acquired by imaging the entire front surface and the entire back surface of the medium, respectively, generate the attribute information of the respective images, and transmit them to the destination apparatus when the entire medium has been imaged in step S111.

Figure 6:
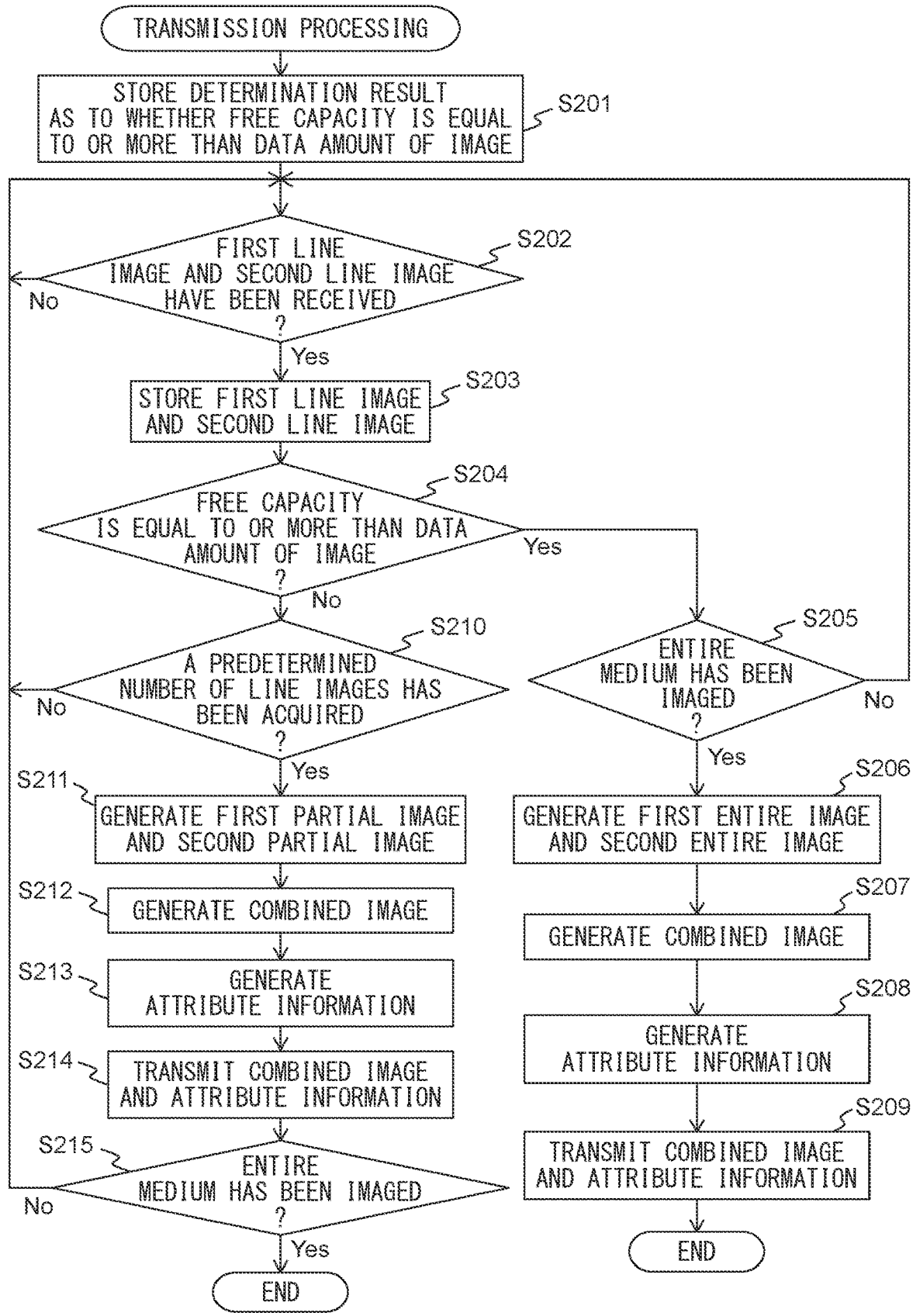
FIG. 6 is a flowchart illustrating an operation example of a transmission processing.

FIG. 6 is a flowchart illustrating an operation example of a transmission processing of the image reading apparatus 100.

Hereinafter, an example of the operation of the transmission processing of the image reading apparatus 100 will be described with referring to the flowchart illustrated in FIG. 6. Note that a flow of the operation described below is performed in cooperation with each element of the image reading apparatus 100 mainly by the second processing circuit 160, based on the program being previously stored in the second storage device 140. The transmission processing is performed for each conveyed medium.

First, the second control module 162 determines whether or not a free capacity of the second image memory 125 before start of reading the medium is equal to or more than a sum of data amounts of the image including the entire medium, and stores the determination result in the second storage device 140 (step S201). When the image acquired by imaging a medium conveyed (read) before a medium currently conveyed (read) has not been transmitted, the image has not been erased from the second image memory 125, and the free capacity of the second image memory 125 may be reduced.

Next, the second control module 162 waits until it receives the first line image and the second line image from the first control module 152 (step S202). That is, the second control module 162 waits until it receives the first line image and the second line image transmitted by the first control module 152 in step S106 of FIG. 5.

When the second control module 162 receives the first line image and the second line image, the second control module 162 stores the received first line image and second line image in the second image memory 125 (step S203). That is, the second image memory 125 temporarily stores an image acquired by the imaging device 116 before the image is transmitted from the second communication device 123.

Next, the second control module 162 refers to the determination result stored in the second storage device 140 in step S201, to determine whether or not the free capacity of the second image memory 125 before start of reading the medium is equal to or more than the sum of the data amounts of the image including the entire medium (step S204).

When the free capacity of the second image memory 125 is equal to or more than the sum of the data amounts of the image, the second control module 162 determines whether or not the entire medium has been imaged (step S205). The second control module 162 determines whether or not the entire medium has been imaged, depending on whether or not it has received the signal indicating that the entire medium has been imaged from the first control module 152. When the entire medium has not been imaged, the second control module 162 returns the process to step S202, and repeats the processes in steps S202 to S205.

On the other hand, when the entire medium has been imaged, the second control module 162 generates a first entire image including the entire front surface of the medium based on the first line images, and generates a second entire image including the entire back surface of the medium based on the second line images (step S206). The second control module 162 generates the first entire image by combining all the first line images acquired so far, and generates the second entire image by combining all the second line images acquired so far. The first entire image is an example of a first image acquired by imaging the front surface of the medium by the imaging device 116, and the second entire image is an example of a second image acquired by imaging the back surface of the medium by the imaging device 116.

Next, the second control module 162 generates a combined image acquired by combining the first entire image and the second entire image (step S207).

Next, the second control module 162 generates the attribute information of the generated combined image (step S208). The attribute information of the combined image includes a division position (a coordinate in the image) of two images included in the combined image, in addition to the horizontal and vertical sizes, the resolution and the order of each image included in the combined image. In the apparatus being the transmission destination, the attribute information is used for dividing the combined image into two images (the first entire image and the second entire image, or the first partial image and the second partial image).

Next, the second control module 162 transmits the combined image and the attribute information of the combined image to the destination apparatus via the second communication device 123 (step S209), and ends the series of steps. The second control module 162 erases all the first line images and the second line images from the second image memory 125. The destination apparatus receives the combined image and the attribute information, and divides the combined image at the division position included in the received attribute information to restore the first entire image and the second entire image. Thus, the second control module 162 transmits the attribute information for dividing the combined image together with the combined image. Thus, the destination apparatus can properly divide the combined image into the original images.

On the other hand, in step S204, when the free capacity of the second image memory 125 is less than the sum of the data amounts of the image, the second control module 162 determines whether or not the predetermined number of the first line images and the second line images have been acquired (step S210). When the predetermined number of the first line images and the second line images have not been acquired, the second control module 162 returns the process to step S202, and newly acquires the first line image and the second line image from the first control module 152.

On the other hand, when the predetermined number of the first line images and the second line images have been acquired, the second control module 162 combines the predetermined number of the first line images to generate the first partial image, and combines the predetermined number of the second line images to generate the second partial image (step S211). The second control module 162 combines the predetermined number of the first line images and the predetermined number of the second line images which have not been transmitted to the destination apparatus, of the acquired first line images and second line images to generate the first partial image and the second partial image, respectively.

Next, the second control module 162 generates the combined image acquired by combining the first partial image and the second partial image (step S212).

Next, the second control module 162 generates the attribute information of the generated combined image (step S213). The attribute information of the combined image includes a division position (a coordinate in the image) of two images included in the combined image, in addition to the horizontal and vertical sizes, the resolution and the order of each image included in the combined image.

Next, the second control module 162 transmits the combined image and the attribute information of the combined image to the destination apparatus via the second communication device 123 (step S214). The second control module 162 erases the first line image and the second line image corresponding to the transmitted first partial image and the second partial image from the second image memory 125. The destination apparatus receives the combined image and the attribute information, and divides the combined image at the division position included in the received attribute information to restore the first partial image and the second partial image. Thus, the second control module 162 transmits the attribute information for dividing the combined image together with the combined image. Thus, the destination apparatus can properly divide the combined image into the original images.

The first partial image and the second partial image are images, each of which includes a partial region of the entire medium. That is, the second control module 162 transmits the first partial image and the second partial image in units of a plurality of partial regions via the second communication device 123 when the free capacity of the second image memory 125 before start of reading the medium is less than the sum of the data amounts of the image including the entire medium. Thus, the second control module 162 can suppress an increase in the processing load required for the image transmission when the second image memory 125 has sufficient free capacity, and can suppress an increase in the processing time required for the image transmission when the second image memory 125 does not have sufficient free capacity.

Next, the second control module 162 determines whether or not the entire medium has been imaged (step S215). The second control module 162 determines whether or not the entire medium has been imaged, depending on whether or not it has received the signal indicating that the entire medium has been imaged from the first control module 152. When the entire medium has not been imaged, the second control module 162 returns the process to step S202, and repeats the processes in steps S202 to S215. On the other hand, when the entire medium has been imaged, the second control module 162 ends the series of steps.

In step S207, the second control module 162 may generate an encoded image to which an image acquired by combining the first entire image and the second entire image is encoded using a predetermined coding system, as the combined image. Similarly, in step S212, the second control module 162 may generate an encoded image to which an image acquired by combining the first partial image and the second partial image is encoded using the predetermined coding system, as the combined image. In those cases, in steps S208, S213, the second control module 162 generates the attribute information so that the quantization table used for encoding and the division position (the coordinate in the image) of two images in the image before encoding is included in the attribute information.

Alternatively, in step S206, the second control module 162 may generate images to which an image acquired by combining all the first line images and an image acquired by combining all the second line images are encoded using the predetermined coding system, as the first entire image and the second entire image, respectively. In that case, in step S207, the second control module 162 generates the combined image by combining the encoded first entire image and second entire image into one file. Similarly, in step S211, the second control module 162 may generate images to which an image acquired by combining the predetermined number of the first line images and an image acquired by combining the predetermined number of the second line images, are encoded by the predetermined coding system, as the first partial image and the second partial image, respectively. In that case, in step S212, the second control module 162 generates the combined image by combining the encoded first partial image and second partial image into one file. In those cases, in steps S210, S213, the second control module 162 generates the attribute information so that the quantization table used for encoding each image and a division position (an address from the top) of two images encoded in the combined image are included in the attribute information.

Further, the processes in steps S201, S204 and S210 to S215 may be omitted, and the second control module 162 may always generate the first entire image and the second entire image to generate the combined image acquired by combining the first entire image and the second entire image when the entire medium has been imaged.

Further, when it is set to read only one side (the front surface) of the medium in the job included in the read request signal, the first control module 152 and the second control module 162 execute the processing only for the first line image. In that case, in steps S201 and S204, the second control module 162 determines whether or not the free space of the second image memory 125 is equal to or more than the sum of the data amounts of the image including one side of the medium.

Recently, the time required for the reading (scanning) processing of the medium is reduced by the improvement of the medium conveying technology and the image reading technology. On the other hand, when data is transmitted according to a predetermined communication protocol such as TCP/IP, the apparatuses communicating with each other transmit and receive signals for confirming the transmission start or the transmission completion, and thereby, the overhead occurs. When the time required for the transmission processing of the image is longer than the time required for the reading processing of the medium, the image reading apparatus 100 needs to delay the reading processing of the medium so that the image memory is not overwritten.

When the image reading apparatus 100 and the destination apparatus are connected to each other by high-speed communication, the effect by the overhead is small. Therefore, the image reading apparatus 100 can complete the transmission processing of the image in as short a time as possible, by transmitting the image acquired by imaging the front surface and the image acquired by imaging the back surface as they are. On the other hand, when the image reading apparatus 100 and the destination apparatus are connected to each other by medium-speed or low-speed communication, the effect by the overhead is large. Thus, the image reading apparatus 100 combines and transmits the image acquired by imaging the front surface and the image acquired by imaging the back surface, so that the communication procedures for the two images are collectively performed at one time, and the overhead is reduced by half. Therefore, the image reading apparatus 100 can shorten the time required for the transmission processing of the image as a total. Also, the destination apparatus can complete the reception processing of the image in a short time, and thereby, display the received image at an early stage. Therefore, the image reading apparatus 100 can improve the convenience of the user.

Further, the image reading apparatus 100 generates one attribute information for an image acquired by combining the two images, rather than generating attribute information for each of the image acquired by imaging the front surface and the image acquired by imaging the back surface. Thus, the image reading apparatus 100 can reduce the time required for generating the attribute information, and reduce the amount of communication required for transmitting the attribute information.

As described in detail above, the image reading apparatus 100 separately transmits the image acquired by imaging the front surface and the image acquired by imaging the back surface when the image is transmitted by high-speed communication such as USB. On the other hand, the image reading apparatus 100 combines and transmits the image acquired by imaging the front surface and the image acquired by imaging the back surface when the image is transmitted by medium-speed/low-speed communication such as LAN. Thus, the image reading apparatus 100 can transmit images efficiently via each of the plurality of communication devices.

Further, the image reading apparatus 100 can reduce the time in which the image is stored in the image memory, by transmitting the image in units of a plurality of regions rather than transmitting the image after the entire medium has been imaged. Thus, the image reading apparatus 100 can utilize an image memory having a small storage capacity, and thereby, reduce the equipment cost.

In an embedded apparatus such as a scanner apparatus, a processor having low processing performance may be used in order to reduce the equipment cost. Such an embedded apparatus may not be able to acquire sufficient time for executing the transmission processing of the image via a medium-speed or low-speed network, in a state where the processing load of the processor is high, such as during the read processing of the medium. Since the image reading apparatus 100 share the processing using the separate processors in the first processing circuit 150 and the second processing circuit 160, it can satisfactorily execute the read processing of the medium and the transmission processing of the image even when a processor having low processing performance is used.

Figure 7:
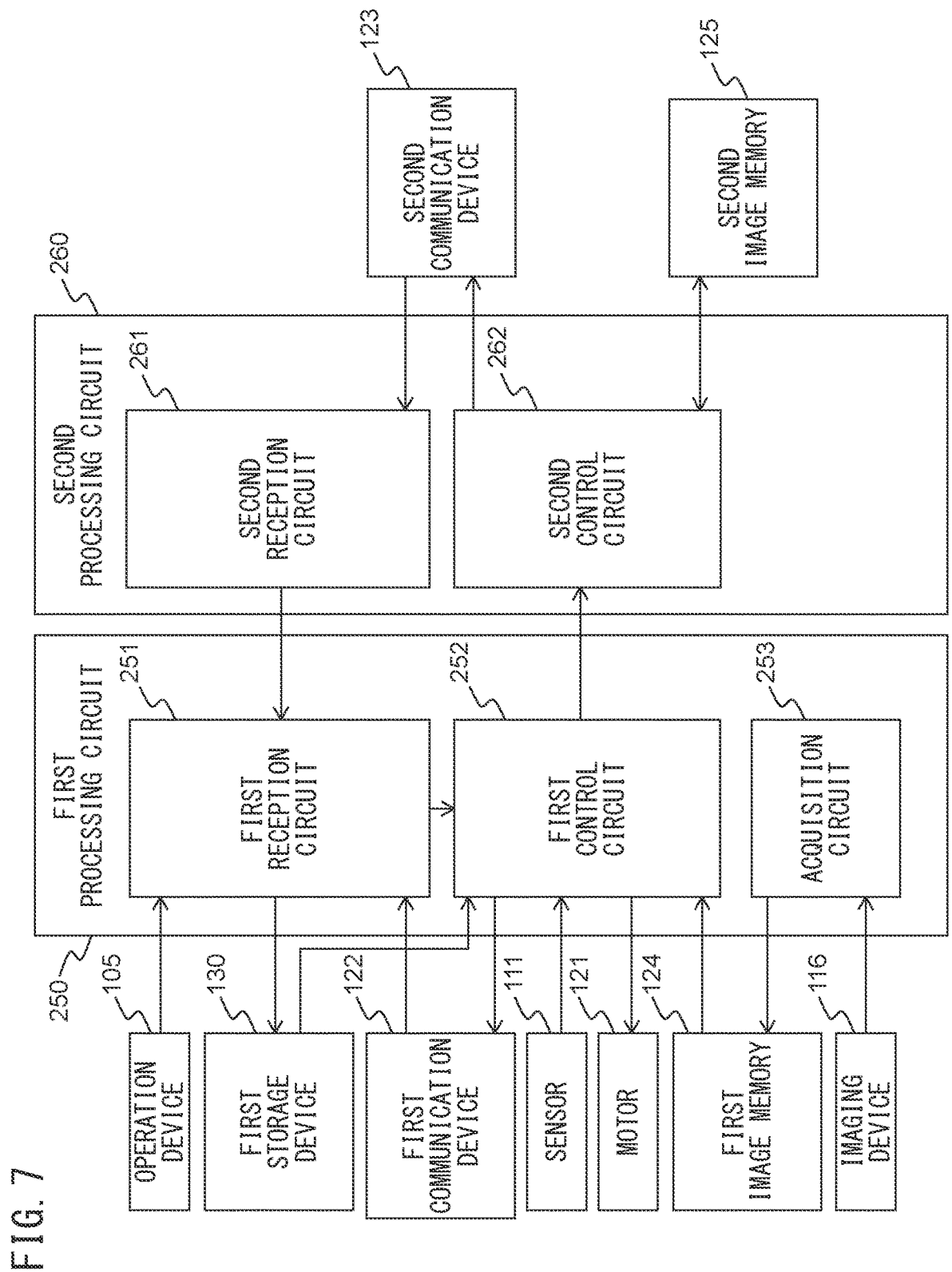
FIG. 7 is a diagram illustrating a schematic configuration of another first processing circuit 250, etc.

FIG. 7 is a diagram illustrating a schematic configuration of a first processing circuit 250 and a second processing circuit 260 in the image reading apparatus according to another embodiment. The first processing circuit 250 is used in place of the first processing circuit 150 of the image reading apparatus 100 and executes the medium reading processing instead of the first processing circuit 150. The second processing circuit 260 is used in place of the second processing circuit 160 of the image reading apparatus 100, and executes the transmission processing instead of the second processing circuit 160. The first processing circuit 250 includes a first reception circuit 251, a first control circuit 252 and an acquisition circuit 253, etc. The second processing circuit 260 includes a second reception circuit 261 and a second control circuit 262, etc. Note that each unit may be configured by an independent integrated circuit, a microprocessor, firmware, etc.

The first reception circuit 251 is an example of a first reception module, and has a function similar to the first reception module 151. The first reception circuit 251 receives the setting of the transmission destination of the image and the communication device used for transmitting the image through the first communication device 122, the second reception circuit 261 or the operation device 105, and stores the setting in the first storage device 130. The first reception circuit 251 receives the read request signal from the first communication device 122, the second reception circuit 261 or the operation device 105, and transmits the signal to the first control circuit 252.

The first control circuit 252 is an example of a first control module, and has a function similar to the first control module 152. The first control circuit 252 controls the motor 121 based on the read request signal received from the first reception circuit 251 and the medium signal received from the sensor 111. The first control circuit 252 reads each line image from the first image memory 124 and reads the setting of the transmission destination of the image and the communication device used for transmitting the image from the first storage device 130. The first control circuit 252 transmits the partial image based on each line image to the destination apparatus via the first communication device 122, or transmits each line image to the second control circuit 262, according to the read setting.

The acquisition circuit 253 is an example of the acquisition module and has a function similar to the acquisition module 153. The acquisition circuit 253 acquires each line image from the imaging device 116, and stores it in the first image memory 124.

The second reception circuit 261 is an example of a second reception module, and has a function similar to the second reception module 161. The second reception circuit 261 receives the setting of the transmission destination of the image and the communication device used for transmitting the image via the second communication device 123, and notifies the first reception circuit 251 of it. The second reception circuit 261 receives the read request signal from the second communication device 123 and transmits the signal to the first reception circuit 251.

The second control circuit 262 is an example of a second control module, and has a function similar to the second control module 162. The second control circuit 262 receives each line image from the first control circuit 252 and stores it in the second image memory 125. The second control circuit 262 reads each line image from the second image memory 125, generates the combined image based on each line image, and transmits it to the destination apparatus via the second communication device 123.

As described in detail above, the image reading apparatus can transmit images efficiently via each of the plurality of communication devices even when the first processing circuit 250 and the second processing circuit 260 are used.

The image reading apparatus, the method, and the computer-readable, non-transitory medium storing the computer program according to the embodiment can transmit images efficiently via each of the plurality of communication devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
   an imaging device;
   a first communication device capable of communicating at a first communication speed according to a first communication protocol;
   a second communication device capable of communicating at a second communication speed lower than the first communication speed according to a second communication protocol different from the first communication protocol;
a first processor to transmit a first image acquired by imaging a first surface of a medium by the imaging device, and a second image acquired by imaging a second surface of the medium by the imaging device, via the first communication device, when the first communication device is set as a communication device used for transmitting an image; and
a second processor to transmit a combined image acquired by combining the first image and the second image via the second communication device, when the second communication device is set as a communication device used for transmitting the image.

2. The image reading apparatus according to claim 1, wherein the second processor transmits attribute information for dividing the combined image into the first image and the second image, together with the combined image.

3. The image reading apparatus according to claim 1, wherein the second processor is a processor separate from the first processor.

4. The image reading apparatus according to claim 1, further comprising a storage device to temporarily store an image acquired by the imaging device before the image is transmitted from the second communication device, wherein
the second processor transmits the first image or the second image in units of a plurality of partial regions via the second communication device when a free capacity of the storage device before start of reading the medium is less than a sum of data amounts of the image including the entire medium.

5. A method for controlling a communication, comprising:
transmitting a first image acquired by imaging a first surface of a medium by an imaging device, and a second image acquired by imaging a second surface of the medium by the imaging device, via a first communication device capable of communicating at a first communication speed according to a first communication protocol, when the first communication device is set as a communication device used for transmitting an image; and
transmitting a combined image acquired by combining the first image and the second image via a second communication device capable of communicating at a second communication speed lower than the first communication speed according to a second communication protocol different from the first communication protocol, when the second communication device is set as a communication device used for transmitting the image.

6. The method according to claim 5, wherein attribute information for dividing the combined image into the first image and the second image is transmitted together with the combined image.

7. The method according to claim 5, wherein
the first image and the second image are separately transmitted via the first communication device by a first processor, and wherein
the combined image is transmitted via the second communication device by a second processor separate from the first processor.

8. The method according to claim 5,
further comprising temporarily storing an image acquired by the imaging device before the image is transmitted from the second communication device, in a storage device, wherein
the first image or the second image is transmitted in units of a plurality of partial regions via the second communication device when a free capacity of the storage device before start of reading the medium is less than a sum of data amounts of the image including the entire medium.

9. A computer-readable, non-transitory medium storing a computer program, wherein the computer program causes an image reading apparatus including an imaging device, a first communication device capable of communicating at a first communication speed according to a first communication protocol, and a second communication device capable of communicating at a second communication speed lower than the first communication speed according to a second communication protocol different from the first communication protocol, to execute a process, the process comprising:
transmitting a first image acquired by imaging a first surface of a medium by the imaging device, and a second image acquired by imaging a second surface of the medium by the imaging device, via the first communication device, when the first communication device is set as a communication device used for transmitting an image; and
transmitting a combined image acquired by combining the first image and the second image via the second communication device, when the second communication device is set as a communication device used for transmitting the image.

10. The computer-readable, non-transitory medium according to claim 9, wherein attribute information for dividing the combined image into the first image and the second image is transmitted together with the combined image.

11. The computer-readable, non-transitory medium according to claim 9, wherein
the first image and the second image are transmitted via the first communication device by a first processor, and wherein
the combined image is transmitted via the second communication device by a second processor separate from the first processor.

12. The computer-readable, non-transitory medium according to claim 9, wherein
the image reading apparatus includes a storage device to temporarily store an image acquired by the imaging device before the image is transmitted from the second communication device, and wherein
the first image or the second image are transmitted in units of a plurality of partial regions via the second communication device when a free capacity of the storage device before start of reading the medium is less than a sum of data amounts of the image including the entire medium.

* * * * *